United States Patent
Quinn et al.

(10) Patent No.: US 9,459,046 B1
(45) Date of Patent: Oct. 4, 2016

(54) PORTABLE FOODWARE CLEANING AND STORAGE SYSTEM

(71) Applicants: Larry Quinn, Boynton Beach, FL (US); Kendra Waterman, Jupiter, FL (US); Steven Waterman, Jupiter, FL (US)

(72) Inventors: Larry Quinn, Boynton Beach, FL (US); Kendra Waterman, Jupiter, FL (US); Steven Waterman, Jupiter, FL (US)

(*) Notice: Subject to any disclaimer, the term of this patent is extended or adjusted under 35 U.S.C. 154(b) by 0 days.

(21) Appl. No.: 14/801,407

(22) Filed: Jul. 16, 2015

(51) Int. Cl.
*F26B 25/18* (2006.01)

(52) U.S. Cl.
CPC ..................... *F26B 25/18* (2013.01)

(58) Field of Classification Search
CPC ...... A47B 81/00; A47B 81/02; A47B 81/04; A47F 5/10; A47F 5/106; A47F 7/0014; A47F 7/0064; A47F 7/28; A47F 7/285; A47G 21/14; A47G 21/145; A47J 45/00; A47J 45/02; A47J 47/00; A47J 47/16; A47J 47/20; F26B 25/18
USPC ......... 211/41.6, 65, 66, 69.1, 70.6, 70.7, 74, 211/75, 105.1, 105.3, 123, 124, 204, 206; 248/304
See application file for complete search history.

(56) References Cited

U.S. PATENT DOCUMENTS

| | | | | |
|---|---|---|---|---|
| 674,868 A | * | 5/1901 | Lane | A47J 47/16 211/41.11 |
| 919,896 A | * | 4/1909 | Lemkes | A47B 81/04 211/41.11 |
| 1,002,063 A | * | 8/1911 | Jasper | A47K 10/04 211/123 |
| 1,186,678 A | * | 6/1916 | Parr | A47B 81/04 211/41.2 |
| 1,192,965 A | * | 8/1916 | White | A47G 21/14 211/41.11 |
| 1,394,947 A | * | 10/1921 | Singer | A47J 47/16 211/41.11 |
| 1,536,885 A | * | 5/1925 | Franklin | A47G 25/10 211/123 |
| 1,787,587 A | * | 1/1931 | Miller | A47J 47/16 211/41.1 |
| 1,814,692 A | * | 7/1931 | Harris | A47J 47/16 211/123 |
| 2,252,873 A | * | 8/1941 | Vassos | A47J 47/16 211/123 |
| 2,572,797 A | * | 10/1951 | Zimmer | A47J 47/16 211/70.6 |

(Continued)

FOREIGN PATENT DOCUMENTS

FR 2865914 A1 * 8/2005 ............. A47B 77/14

OTHER PUBLICATIONS

"Patent Translate", Translation of Application FR2865914, dated Aug. 2005.*

*Primary Examiner* — Joshua Rodden
(74) *Attorney, Agent, or Firm* — Akerman LLP (57) ABSTRACT

A foodware storage system includes a storage rack, a hook assembly, and a foodware item. The storage rack includes a rod having an adjustable length coupled between a first support and a second support to maintain the rod in an elevated position above a surface upon which the storage rack is placed. The rod is disconnectably connected to at least one of the supports. The hook assembly includes a hanger and a hook. The hook is suspended from the hanger and the hanger is configured to slidably move along the adjustable length of the rod. The foodware item has an aperture dimensioned to receive the hook such that the foodware item can be hung from the hook to dry when wet.

18 Claims, 8 Drawing Sheets

(56) References Cited

U.S. PATENT DOCUMENTS

| | | | | |
|---|---|---|---|---|
| 2,606,666 A * | 8/1952 | Gray | ................ | A47J 47/16 211/113 |
| 2,987,289 A * | 6/1961 | Wamsley | ................ | A47J 47/16 211/116 |
| 3,243,074 A * | 3/1966 | Rindner | ................ | A47J 47/16 220/212 |
| 3,854,590 A * | 12/1974 | Dolby | ................ | A47G 23/0241 211/74 |
| 4,290,531 A * | 9/1981 | Lazarus, III | ............ | A47J 47/16 211/113 |
| 5,238,127 A * | 8/1993 | Geller | ................ | A47F 5/0876 211/113 |
| 6,227,387 B1 * | 5/2001 | Rose | ................ | A47J 47/16 211/113 |
| 6,976,595 B1 * | 12/2005 | Geller | ................ | A47F 5/0838 211/124 |
| D595,093 S * | 6/2009 | McComas | ................ | D7/546 |
| 7,766,290 B1 * | 8/2010 | Bradbury | ................ | A47B 77/14 248/200.1 |
| 2006/0011787 A1 * | 1/2006 | Law | ................ | A47J 37/0786 248/121 |
| 2014/0346129 A1 * | 11/2014 | Hall | ................ | A47J 47/16 211/162 |

\* cited by examiner

PORTABLE FOODWARE CLEANING AND STORAGE SYSTEM

FIELD OF INVENTION

The present application generally relates to portable foodware systems, and more particularly, to camping portable foodware cleaning and storage systems.

BACKGROUND

While traveling, for example as with camping, a traveler may have a wide array of dishes, utensils, and other items to use. Without the conveniences of modern life consisting of tables and countertops, a camper may be without a clean surface for storing dishes. Likewise, a camper may be without a clean, dry surface for placing dishes after they are cleaned. Faced with the option of placing a clean dish on the dirt ground, a camper may wash and dry each dish one by one. Such an arrangement is time consuming and inefficient.

SUMMARY

The present application includes a portable storage system for foodware, such as which may include dinnerware, cookware, utensils, etc. used for containing, preparing, cooking, serving, consuming, or storage of food. The present application also includes foodware configured for use as a component of the portable drying and storage system. The storage system can be used to provide a portable, light weight, expandable and shrinkable system for use to hold and support dinnerware and utensils when a clean surface is not available, such as when camping. The storage system may include a hanger configured to provide a single user with a sturdy structure for hanging clean but still wet dinnerware so that they can dry without touching a dirty surface, such as a dirt ground. As such, the single user can continue to wash all dinnerware and simply hang the dinnerware to dry. Once dry, the storage system can be contracted to a compressed storage arrangement where the storage system and the accompanying dinnerware, cookware, or utensils can be stored in a compact configuration. The storage system can be stored in its own bag, case, or other container with a carrying handle, such as a strap, or can be stored amongst other pieces of equipment.

In one aspect, a foodware storage system includes a storage rack, a hook assembly, and a foodware item. The storage rack includes a rod having an adjustable length coupled between a first support and a second support to maintain the rod in an elevated position above a surface upon which the storage rack is placed. The rod is disconnectably connected to at least one of the supports. The hook assembly includes a hanger and a hook. The hook is suspended from the hanger and the hanger is configured to slidably move along the adjustable length of the rod. The foodware item has an aperture dimensioned to receive the hook such that the foodware item can be hung from the hook to dry when wet.

In various embodiments, the supports have a height that is greater than a maximum height of the foodware item such that when the foodware item is hung from the hook, the foodware item is suspended above and does not contact the surface upon which the storage rack is placed. The foodware item may be a plate having plate dimensions. The supports may have a width at least as large as a largest of the plate dimensions. The rod may be a telescoping rod. The rod may be lockable in a fixed position. The system may further comprise a compact storage configuration and a drying configuration. The adjustable length of the rod may be reduced in the compact storage configuration and the adjustable length of the rod is expanded in the drying configuration. The hanger may define an inner dimension greater than an outer dimension of the rod such that the hanger may freely slide onto and along the adjustable length of the rod. The hanger may define an arcuate portion that defines the inner dimension. The hook may be integral with the hanger. The hanger may be selectively removable from the rod.

In another aspect, a foodware storage system comprises a storage rack comprising a rod having an adjustable length and supports connected to the rod. The rod is disconnectably connected to at least one of the supports. The storage rack includes a drying configuration and a compact storage configuration. In the drying configuration, the supports maintain the rod in an elevated position above a surface upon which the storage rack is placed; The system further includes a foodware item having an aperture with a clearance greater than a largest dimension of the rod. In the drying configuration, the foodware item is hung from the rod by the rod passing through the aperture of the foodware item such that the foodware item can be hung from to dry when wet.

In various embodiments, the supports may be configured to support the rod at a height greater than a largest height of the foodware item such that when the foodware item is hung from the rod the foodware item may be suspended above and does not contact the surface upon which the storage rack is placed. The foodware item may be a plate having plate dimensions. The supports may have a width at least as large as a largest of the plate dimensions. The rod may be a telescoping rod. The rod may be lockable in a fixed position. The adjustable length of the rod may be reduced in the compact storage configuration and expanded in the drying configuration. The adjustable length of the rod may be lockable in the compact storage configuration, the drying configuration, or both.

These and other features of the portable storage system, and its various embodiments, are described in the following detailed description, drawings, and appended claims.

DETAILED DESCRIPTION

Various embodiments of a portable foodware system are disclosed. In one embodiment, the portable foodware system may be configured for drying foodware. In this or another embodiment, the portable foodware system may be configured for drying and storage of foodware. In some embodiments, the portable foodware system may include foodware items configured for use as a component of the portable foodware system. As used herein, foodware and items thereof may collectively refer to dinnerware such as dishes and cups including plates, bowls and saucers as well as flatware including forks, spoons, knives, variations thereof as well as other utensils used to manipulate food for serving or consumption of the food. Foodware may also be used herein to refer to cookware used for cooking or preparing food such as pots, pans, strainers, mixing bowls, and utensils such as mashers, spatula, tongs, as examples.

In one embodiment, a dinnerware storage system can include a storage rack having a support connected by an rod, where the rod can have an adjustable length and be disconnectably connected to a rack support. In one embodiment, the storage rack comprises a rod and at least two supports wherein at least one of the two supports may be selectively connected to the rod. Also, the supports can maintain the rod in an elevated position above a surface upon which the storage rack is placed. The system can also include a hook assembly having a hook suspended from a hanger, where the dimension of the hanger is greater than a diameter of the rod and surrounds the rod such that the hook assembly is free to slidably move along the length of the rod. The system can also include a foodware item having an aperture into which the hook can be inserted. Accordingly, the foodware item can be hung from the hook to dry when wet. Additionally, the supports can have a height that is greater than a maximum height of the foodware item such that when the foodware item is hung from the hook, the foodware item is suspended above and does not contact the surface upon which the storage rack is placed. In one embodiment, the foodware item can be a plate having plate dimensions, and the supports have a width at least as large as a largest of the plate. dimensions. Also, the rod can be a telescoping rod and can be lockable in a fixed position.

In another embodiment, a foodware storage system can include a storage rack having a support connected or connectable to a rod having an adjustable length. In one embodiment, when the storage rack includes multiple supports, the rod may be diconnectably connect to at least one of the storage supports. The support can be structured to maintain the rod in an elevated position above a surface upon which the storage rack is placed. A foodware item can be provided. The foodware item can have an aperture with a clearance greater than a largest diameter of the rod. When in a drying configuration, the foodware item can be hung from the rod by the rod passing through the aperture of the foodware item such that the foodware item can be hung from to dry when wet. In one arrangement, the rack supports can have a height that is greater than a maximum height of the foodware item such that when the foodware item is hung from the hook, the foodware item is suspended above and does not contact the surface upon which the storage rack is placed.

Figure 1:
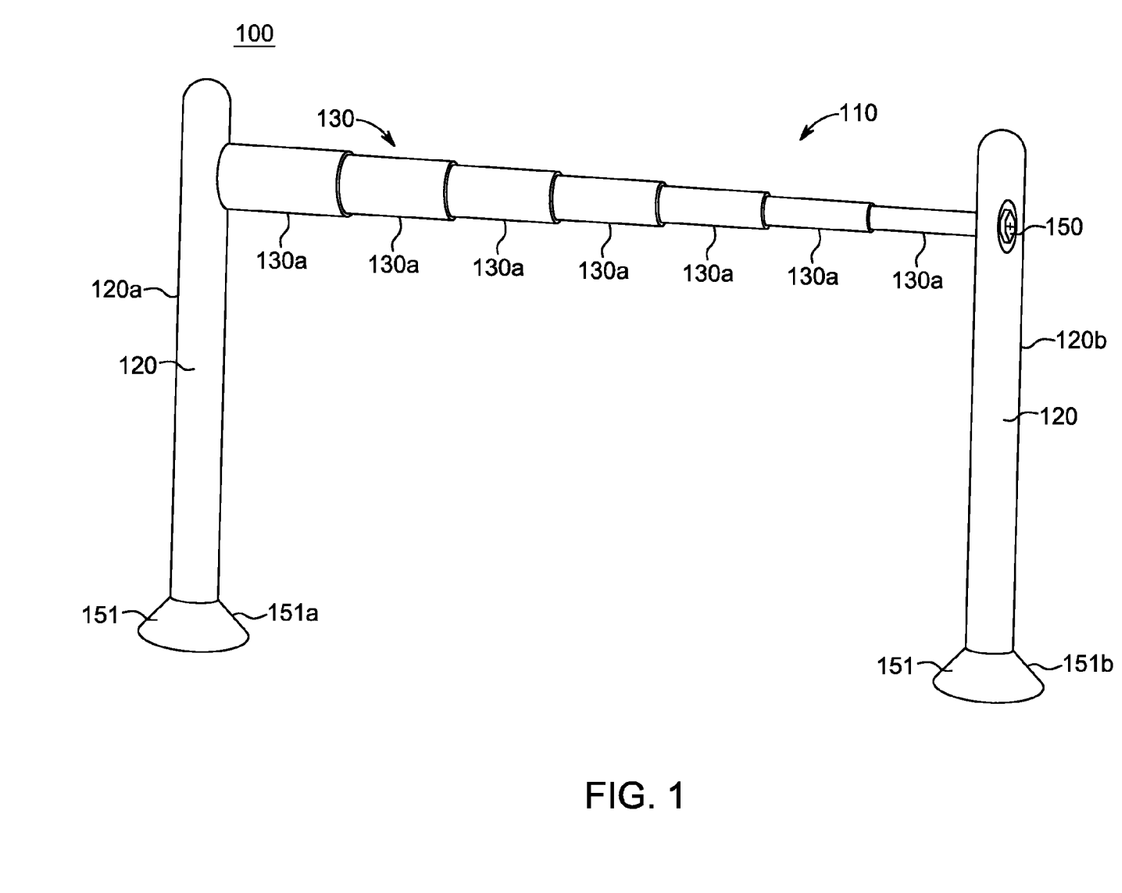
FIG. 1 is an embodiment of a component of a storage rack system according to the present disclosure.
Figure 6A:
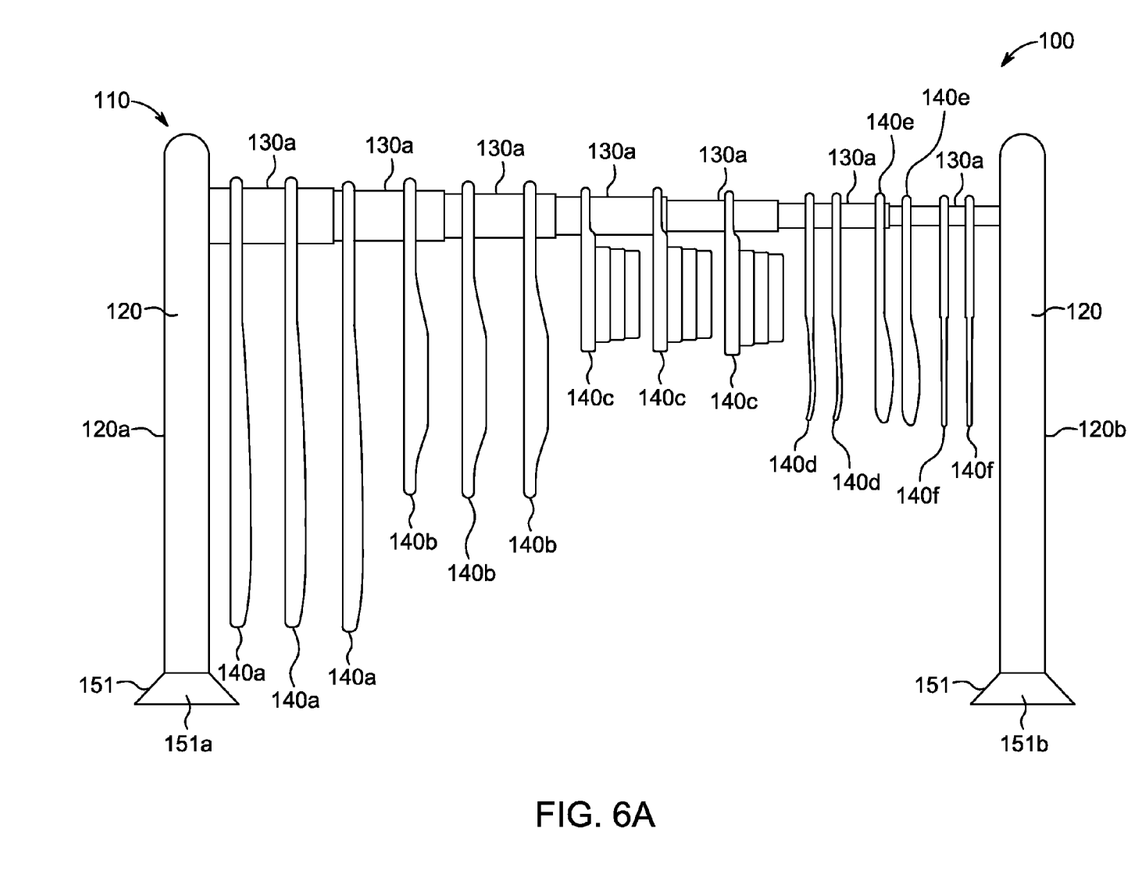
FIGS. 6A & 6B are another embodiment of components of a storage rack system according to the present disclosure.

Various embodiments of the portable foodware system will be described with reference to the FIGS. 1-7. FIG. 1 illustrates an embodiment of the portable foodware system 100 wherein the system includes an adjustable length rack 110. The rack 110 includes at least one rack support 120 having a base 151 structured to support a rod 130. As illustrated, the rack 110 includes two supports 120a, 120b, each having a base 151a, 151b. The rack 110 may beneficially provide a sturdy structure for hanging clean but still wet foodware items 140, an example of which is shown in FIG. 6A, so that they can dry without touching a dirty surface. For example, a user may setup the rack 110 and suspend foodware items 140 from the rack 110. The foodware items 140 may be suspended after washing for drying. In one embodiment, the foodware items 140 may be suspended prior to washing and then subsequently washed while suspended from the rod 130. The rod 130 may comprise an adjustable length to allow the user to expand or reduce the length of the rod 130. For example, in a reduced length configuration, the rod 130 may have a length less than that of the rod 130 in an expanded length configuration as shown in FIG. 1. The reduced length configuration may allow for increased portability of the rod 130 or additional components of the system 110, such as foodware items 140. The rod 130 may be transitioned to the expanded length configuration from the reduced length configuration to provide a greater length or area onto which foodware items 140 may be suspend, e.g., for drying or washing.

In various embodiments, the rod 130 comprises a plurality of rod sections 130a that may be manipulated to transition the rod 130 between the reduced length configuration and the expanded length configuration. In one embodiment, the rod 130 comprises a telescoping arrangement wherein the rod sections 130a are nestable to transition the rod 130 between the reduced length configuration and the expanded length configuration. The rod sections 130a may be slidably mounted so as to be slidable within each other. Transitioning the rod 130 from the reduced length configuration to the expanded length configuration may include sliding the rod sections 130a away from each other to expand the rod 130 to the desired length and thereafter locking the length of the rod 130. In one embodiment, the rod sections 130a are relatively rotatable to expand or reduce the length of the rod. In one such embodiment, transitioning the rod 130 between the reduced length configuration to the expanded length configuration includes rotating at least one rod section 130a relative to another rod section 130a to adjust the length of the rod 130. The rod sections 130a may also be modular such that two rod sections 130a may by decoupled and coupled to transition the rod 130 between the reduced length configuration and the expanded length configuration.

Figure 6B:
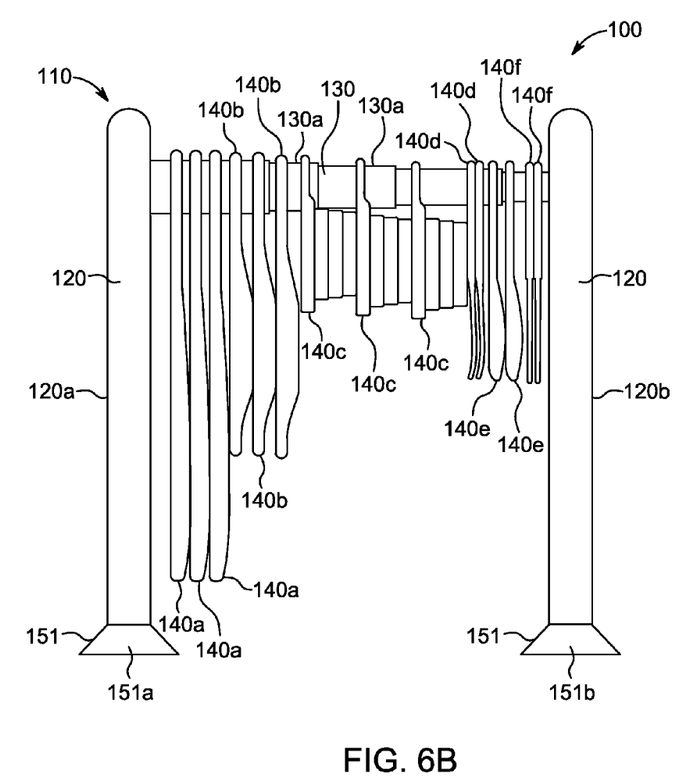

In the above embodiments, the length of the rod may be locked, for example by rotating the rod 130 or one or more rod sections 130a, such as by the inclusion of a detent. Adjustability of the rod 130 may also include locking the length rod 130 in its reduced length configuration suitable for compact storage, an example of which is shown in FIG. 6B. When the system 100 is in the compact storage configuration, locking the length of the rod 130 may be used to prevent the rod 130 from expanding unexpectedly. When foodware items 140 are stored with the system 100 in the compact storage configuration locking the length of the rod 130 may keep the rack 110 and the foodware items 140 stored therewith, in a compact, organized arrangement. The rack 110 may also include a locking feature instead or in addition to locking the rod 130. For example, in embodiments including two or more supports 120a, 120b, the supports may be coupleable by a link or latch, e.g., between bases 151a, 151b or along a perimeter dimension of the rack, to stabilize the system 100 in the storage configuration. The system 100 may also include carrying features such as a handle or straps, which may be attached or attachable to the rack 110, e.g., to supports 120a, 120b. The handle or straps may allow the system 100 to be portable by carrying like a suitcase or backpack.

The rod 130 can also be is disconnectably connected to at least one rack support 120a,120b. "Disconnectably connected" means that the rod 130 can be connected and disconnected without damaging the rack support 120a, 120b. In one embodiment, the rod 130 can be disconnectably connected to rack support 120b by an attachment device such as a screw 150 for example. The screw 150 may fasten the rod 130 to the rack support 120b by, for example, insertion through the rack support 120b and into a female, threaded end of the rod 130. The screw 150 can be hand tightened or tightened with a screw driver. To disconnect the rod 130 from the rack support 120b, the screw 150 can be loosened and removed. Other forms of disconnectable connections can be used, such as a detent ball located on the rod 130; a clamp; a retaining bolt insertable between the rod 130 and one of support 120a, 120b; or matable fittings formed on the rod 130 or rod section 130a and one of support 120a, 120b such as a compression fitting, a locking tab and groove, or a complementary fitting.

Figure 2:
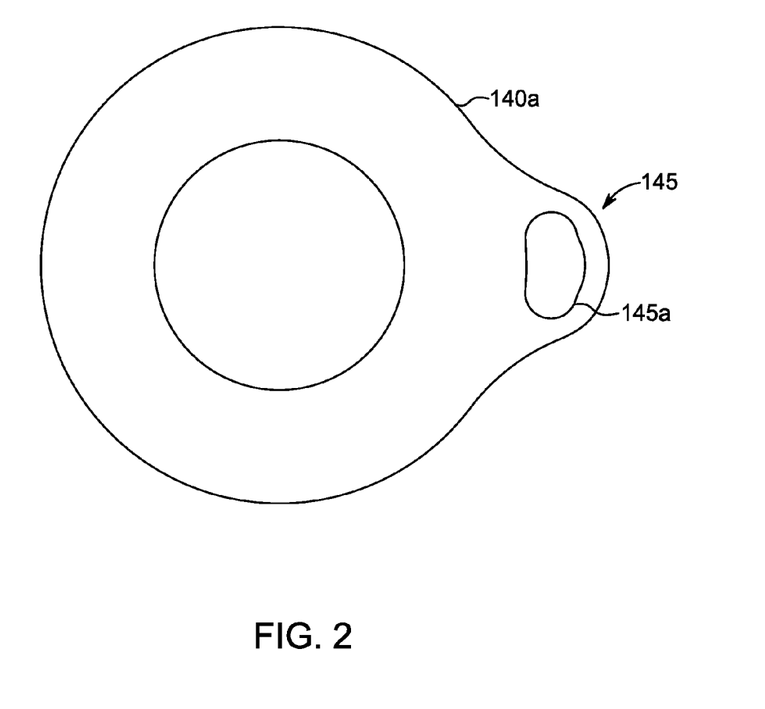
FIG. 2 is another embodiment of components of a storage rack system according to the present disclosure.
Figure 3A:
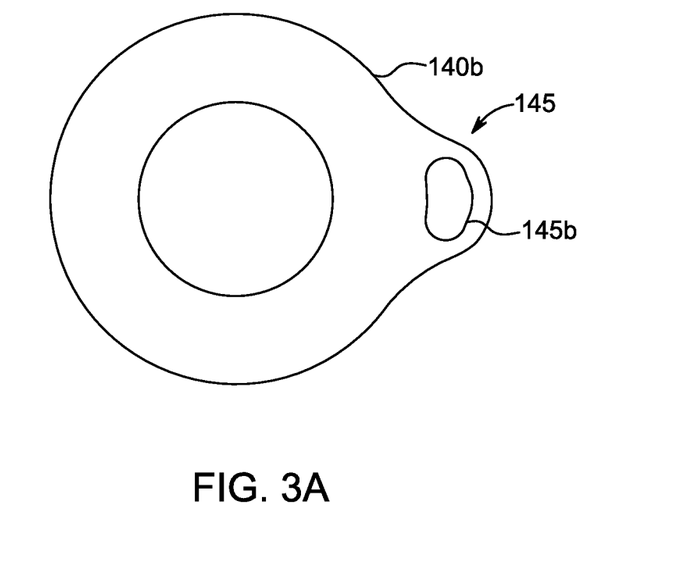
FIGS. 3A & 3B are an embodiment of components of a storage rack system according to the present disclosure.
Figure 3B:
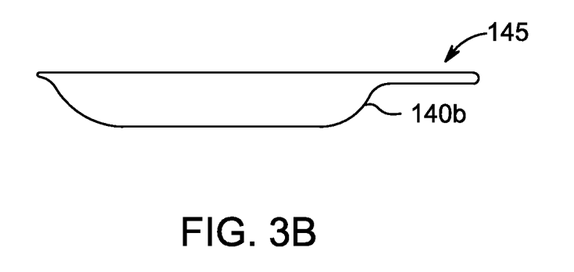
Figure 4A:
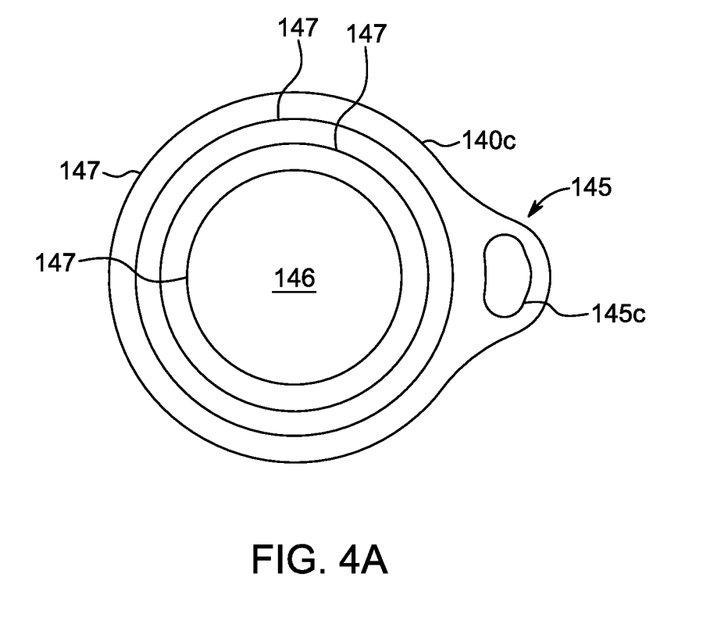
FIGS. 4A & 4B are another embodiment of components of a storage rack system according to the present disclosure.
Figure 4B:
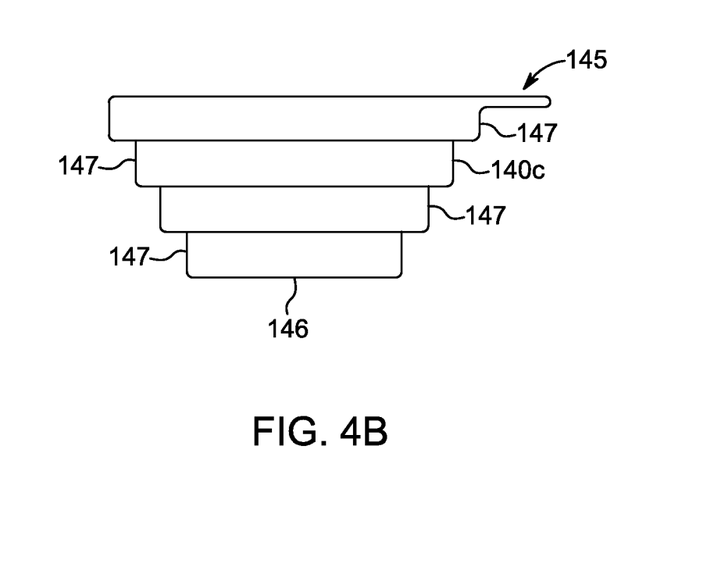
Figure 5:
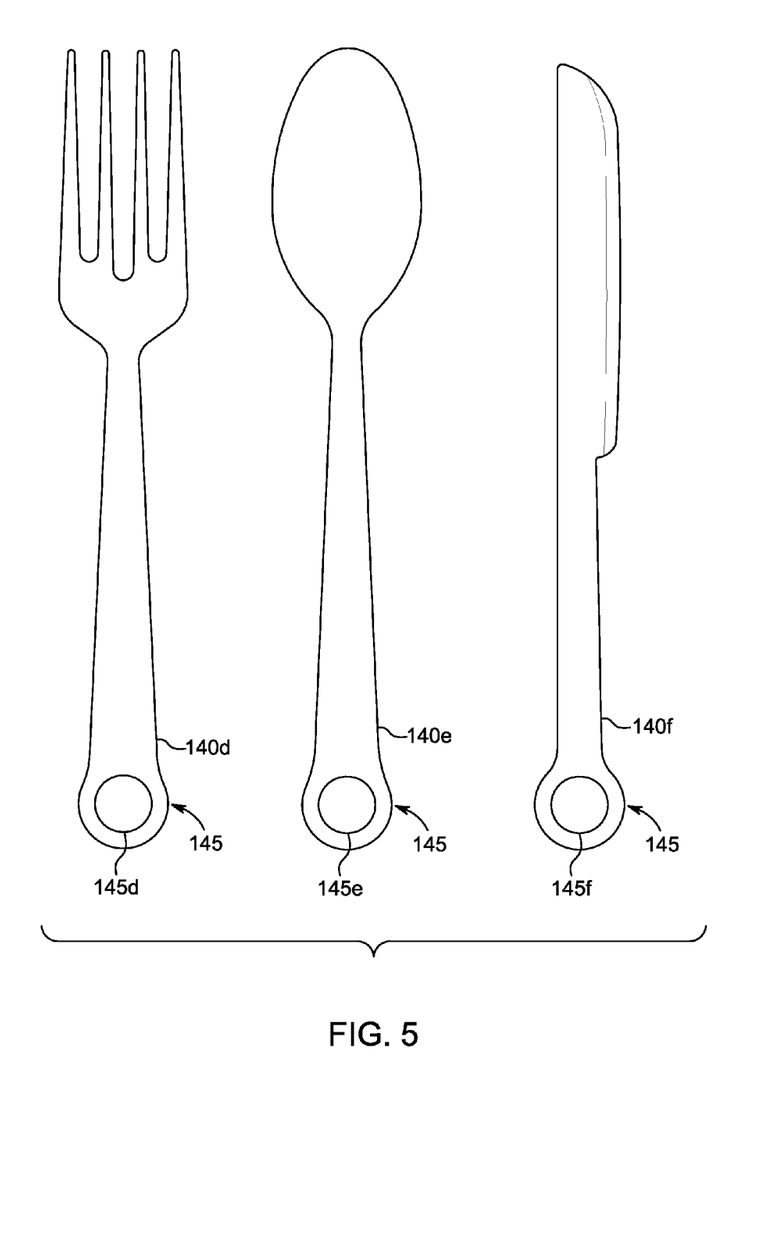
FIG. 5 is another embodiment of components of a storage rack system according to the present disclosure.

The system 100 may also include one or more foodware items. Non-limiting examples of suitable foodware items 140 defining apertures 145 for suspending the foodware items 140 are illustrated in FIGS. 2-5. The apertures can have a large enough clearance to accommodate at least the outer circumference of the rod 130 or to receive a hook. FIG. 2 illustrates a foodware item 140 comprising a dinnerware plate 140a. FIG. 3A illustrates a top view of a dinnerware bowl 140b having aperture 145b. FIG. 3B illustrates a side view of the dinnerware bowl 140b. FIG. 4A illustrates a top view of a dinnerware cup 140c having aperture 145c. FIG. 4B illustrates a side view of the cup 140c. The cup 140c is illustrated in a collapsible configuration wherein the cup 140c comprises a base 146 and a plurality of telescoping rings 147 slidable to extend the wall and depth of the cup 140c. FIG. 5 illustrates utensils comprising a fork 140d, a spoon 140e, and knife 140f each defining an aperture 145d, 145e, 145f. In some embodiments, the apertures 145 may include features configured to improve retention of hooks, e.g., the apertures 145 may include notches formed along the inner circumference or side of the aperture to more securely receive a portion of a hook. Apertures 145 may include features such as raised bumps or materials configured to increase or decrease the slidability of the foodware items 140 along the rod 130.

The rack supports 120a and 120b can a sufficient height to maintain the rod 130 in an elevated position above a surface upon which the rack is placed, for instance a dirt ground. The height at which the rod 130 is maintained can accommodate a wide variety of foodware. In one embodiment, the height of the support 120a, 120b can be greater than a maximum height of the foodware item. In this configuration, when the foodware item is hung, the foodware item is suspended above and does not contact the surface upon which the storage rack 110 is placed. For example, the rack may comprise one or more supports 120a,120b wherein the supports 120a, 120b elevate the rod 130 above a surface along the base of the supports at a height of 14 inches. With such an arrangement, a 12 inch plate, with its greatest dimension being its diameter of 12 inches, would hang from the rod 130 with a height of 12 inches plus any additional length associated with the manner in which the plate is suspended. Thus, the manner of suspension is preferably less than 2 inches in this arrangement to prevent the plate from touching the surface upon which the storage rack 110 is placed. It will be appreciated that other heights may be used in consideration of a size of foodware item 140 used, convenience, and portability. In one embodiment, the support 120a, 120b may comprise an adjustable height. For example, the height of the support 120a, 120b may be adjustable in a manner similar to the rod 130, e.g., telescoping or a modular section arrangement. The adjustable height may also allow a user to adjust the height of the rod 130 to account for size variations in foodware item 140 to be dried.

The rack supports 120a and 120b can also have a width sufficient to sturdily support multiple foodware items hanging from the rod 130. In one embodiment, the one or more rack supports 120a, 120b have a base 151a, 151b defining a width. The base 151a, 151b may include a platform extending a portion of the height of the support 120a, 120b (a example of which is shown in FIG. 1) or the entire height of the support 120a, 120b. In some embodiments, the base 151a, 151b may include legs extending the entire or a portion of the height of the support 120a, 120b. The legs may be rotatable laterally or hinged to expand the width of the base 151a, 151b or longitudinally, e.g., similar to a tripod. In one embodiment, the width of the base is at least as large as a largest of the dimensions of the largest foodware item 140 component of the system 100. As an example, for a typical 12 inch plate, the largest dimension of the plate is the diameter of the plate at 12 inches. The rack support 120 can be at least 12 inches wide, sufficient to support the plate without tipping. In one embodiment, one or more supports 120a, 120b include a storage compartment (not shown). The storage compartment may be used to store foodware items 140, such as smaller foodware items such as utensils, between uses. The storage compartment preferably includes a width less than to approximately or slightly greater than the width of a largest foodware item 140 component of the system 100, such as a plate 140a, as to not overly increase a profile dimension of the system 100 in the storage configuration. In some embodiments, the storage compartment may be attachable or suspendable from the rack 110, e.g., along the rod 130.

Both of the storage rack 110 and the foodware times 140 can made of a durable, light weight plastic, metal, ceramic, combination thereof, or other suitable materials.

In use, a user may place a foodware item 140 on the storage rack 110 for storage, to dry after washing, or, in some embodiments, to wash. To suspend the foodware item 140 from the rod 130, the user may disconnect the rod 130 from a support 120, such as support 120b. In this example with a plate 140a, the user can guide the plate 140a such that rod 130 passes through the aperture 145a such that plate 140a hangs from the rod 130. The user can add as many foodware items as may fit. Once the desired amount of foodware items 140 have been guided onto the rod 130 via their apertures 145, the rod 130 can be detachably re-connected to the rack support 120b. The items of foodware 140 can be slid along the length of the rod 130.

In a drying configuration, the rod 130 can be extended to the extended configuration to allow for each foodware item 140 to be freely suspended without touching the ground or other foodware items. Once dry, or when preparing for storage, the system 100 can be converted to a compact arrangement for storage. All of the foodware items 140 can slide along the rod 130 to be pressed against each other. The rod 130 can be shortened to the shortest possible length while still securing holding the foodware items 140. The rod 130 can then be locked in place. When a dish is desired, the rod 130 can be disconnected from the rack support 120b and a foodware item 140 (or all of them) can be removed.

Figure 7:
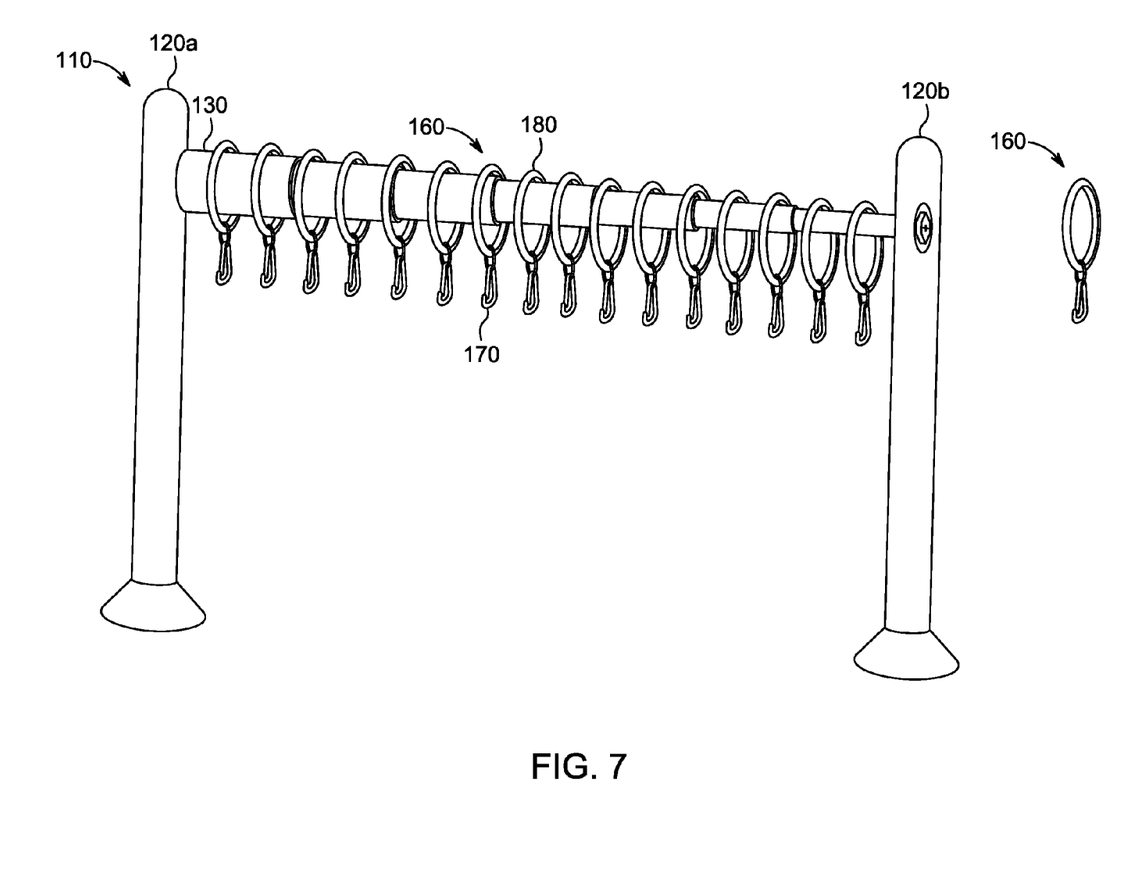
FIG. 7 is another embodiment of components of a storage rack system according to the present disclosure.

In another embodiment and with reference to FIG. 7, hook assemblies 160 can be included on rod 130. The hook assemblies 160 can include a hook 170. The hook 170 may include or be connectably associable with a hanger 180 structured to engage the rod 130 and thereby suspended the hook 170. The hanger 130 may have a configuration that is open or closed (as shown) defining a inner dimension of the hanger 180 greater than an outer dimension of the rod 130. In other embodiments, the hanger 180 may include an open configuration. The open configuration may be fixed with respect to an inner dimension or may be selectively closed and reopened, e.g., by manipulating a hinged or slidable section. The hanger 180 may similarly be made from a reconfigurable structure or reformable or elastomeric material that may be manipulated by the user to change the size of a gap in the hanger 180 or the inner diameter of the hanger 180. The hanger 180 may have an arcuate shape (as shown); however, any shape wherein the hanger may slidably move along the length of the rod 130 may be used. As shown, the hanger 180 surrounds the rod 130 such that the hook assembly 160 is free to slidably move along the length of the rod 130. In some embodiments, the hook assembly 160 or the hanger 180 is freely movable along the entire adjustable length or just a portion of the adjustable length. In one embodiment, (not shown) the rod 130 defines a gap configured to receive a portion of the hanger 180. In one embodiment, the hook assembly 160 or the hanger 180 may be configured to be removed from the rod. In other embodiments, the hook assembly 160 or the hanger 180 may be configured to remain along the rod whereby foodware items may be coupled to the hooks and hung from the rod 130 when the rod 130 is supported by the support 120a, 120b. The hook assemblies 160 can made of a durable, light weight plastic, metal, ceramic, combination thereof, or other suitable materials. The hook 170 may be movably coupled to the hanger 180 such that the hook may move relative to the hanger 180 when coupled. In one embodiment the hook 170 is integral with the hanger 180. For example, the hook 170 and hanger 180 may comprise an "S" configuration.

In use, a user can hang a foodware item 140 from the storage rack 110. A user can do so by guiding a foodware item 140 such that the hook 170 of hook assembly 160 passes through the aperture 145. For example, a user can hang utensils 140d, 140e and 140f by guiding individual hooks 170 though apertures 145d, 145e and 145f.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A portable foodware storage system, comprising:
a portable storage rack comprising a rod coupled between a first support and a second support to maintain the rod in an elevated position above a surface upon which the storage rack is placed, the rod comprising an adjustable length to selectively transition the rod while in use between a first length maintained above the surface and a second length maintained above the surface, wherein a distance between the supports is reduced when the rod is selectively transitioned from the first length to the second length, and wherein the rod is disconnectably connected to at least one of the supports, such that the rack can be disassembled for portability between uses;
a hook assembly comprising a hanger and a hook, the hook suspended from the hanger, and the hanger configured to slidably move along the adjustable length of the rod,
a foodware item having an aperture dimensioned to receive the hook such that the foodware item can be hung from the hook to dry when wet.

2. The portable foodware storage system of claim 1, wherein the supports have a height that is greater than a maximum height of the foodware item such that when the foodware item is hung from the hook, the foodware item is suspended above and does not contact the surface upon which the storage rack is placed.

3. The portable foodware storage system of claim 1, wherein the foodware item is a plate having plate dimensions, and the rack having a width at least as large as a largest of the plate dimensions.

4. The portable foodware storage system of claim 1, wherein the rod is a telescoping rod.

5. The portable foodware storage system of claim 1, wherein the rod is lockable in a fixed position.

6. The portable foodware storage system of claim 1, further comprising a compact storage configuration and a drying configuration, wherein the adjustable length of the rod is reduced in the compact storage configuration and the adjustable length of the rod is expanded in the drying configuration.

7. The portable foodware storage system of claim 1, wherein the hanger defines an inner dimension greater than an outer dimension of the rod such that the hanger may freely slide onto and along the rod.

8. The portable foodware storage system of claim 7, wherein the hanger defines an arcuate portion that defines the inner dimension.

9. The portable foodware storage system of claim 7, wherein the hook is integral with the hanger.

10. The portable foodware storage system of claim 7, wherein the hanger is selectively removable from the rod.

11. A portable foodware storage system, comprising:
a portable storage rack comprising a rod and supports connected to the rod to maintain the rod in an elevated position above a surface upon which the portable storage rack is placed, the rod having an adjustable length to selectively transition the rod while in use between a first length maintained above the surface by the supports and a second length maintained above the surface by the supports, wherein a distance between the supports is reduced when the rod is selectively transitioned from the first length to the second length, wherein the rod is disconnectably connected to at least one of the supports, such that the rack can be disassembled for portability between uses, the storage rack having a drying configuration and a compact storage configuration, and wherein in the drying configuration the supports maintain the rod in the elevated position above the surface;

a foodware item having an aperture with a clearance greater than a largest dimension of the rod;

when in the drying configuration, the foodware item is hung from the rod by the rod passing through the aperture of the foodware item such that the foodware item can be hung to dry when wet.

12. The portable foodware storage system of claim 11, wherein the supports support the rod at a height greater than a largest height of the foodware item such that when the foodware item is hung from the rod, the foodware item is suspended above and does not contact the surface upon which the storage rack is placed.

13. The portable foodware storage system of claim 11, wherein the foodware item is a plate having plate dimensions, and the rack having a width at least as large as a largest of the plate dimensions.

14. The portable foodware storage system of claim 11, wherein the rod is a telescoping rod.

15. The portable foodware storage system of claim 11, wherein the rod is lockable in a fixed position.

16. The portable foodware storage system of claim 15, wherein the adjustable length of the rod is reduced in the compact storage configuration and expanded in the drying configuration, and wherein the adjustable length of the rod is lockable in the compact storage configuration, the drying configuration, or both.

17. The portable foodware storage system of claim 1, wherein the supports comprise a first support and a second support connected to the rod, and wherein, when the rod is connected to both the first support and the second support, the first support is disconnectable from the rod without changing the length of the rod.

18. The portable foodware storage system of claim 11, wherein the supports comprise a first support and a second support connected to the rod, and wherein, when the rod is connected to both the first support and the second support, the first support is disconnectable from the rod without changing the length of the rod.

* * * * *